United States Patent [19]

Schurr

[11] Patent Number: 4,683,660
[45] Date of Patent: Aug. 4, 1987

[54] CHAIN SAW HAVING A BRAKING ARRANGEMENT

[75] Inventor: Volker Schurr, Schwieberdingen, Fed. Rep. of Germany

[73] Assignee: Andreas Stihl, Waiblingen, Fed. Rep. of Germany

[21] Appl. No.: 764,221

[22] Filed: Aug. 9, 1985

[30] Foreign Application Priority Data

Aug. 22, 1984 [DE] Fed. Rep. of Germany ....... 3430840

[51] Int. Cl.$^4$ .............................................. B27B 17/02
[52] U.S. Cl. ......................................... 30/382; 30/381
[58] Field of Search ........................ 30/381, 382, 383; 188/77 R, 166; 83/DIG. 1

[56] References Cited

U.S. PATENT DOCUMENTS 4,432,139  2/1984  Köhler et al. .................... 30/382 X
4,594,780  6/1986  Schliemann et al. ............ 188/166 X

FOREIGN PATENT DOCUMENTS 962920    2/1975  Canada ................................. 30/383
3150769   6/1983  Fed. Rep. of Germany ........ 30/381

Primary Examiner—Donald R. Schran
Assistant Examiner—Michael D. Folkerts
Attorney, Agent, or Firm—Walter Ottesen

[57] ABSTRACT

A braking arrangement for a motor-driven chain saw is disclosed. The braking arrangement is actuable by a releasing device and is held in the release position against a spring force by means of a latching device. The braking arrangement includes a brake band holding member to which a brake band is fastened. The brake band can be tightened around a clutch drum of the motor-driven chain saw by means of an ancillary chain brake device provided in addition to the chain brake device, so that the clutch drum is brought to an immediate stop. This braking action occurs also if the releasing device of the chain brake device is not actuated. In this way, the chain brake device remains activated thereby enabling it to act during operation of the chain saw, for example, in the event that the motor-driven chain saw kicks back while the saw chain is running. The ancillary chain brake device is preferably operable by the throttle lever or the throttle lever locking device so that the clutch drum is braked on throttling back. In this way, a continued running of the saw chain after release of the throttle is thereby reliably prevented.

18 Claims, 15 Drawing Figures

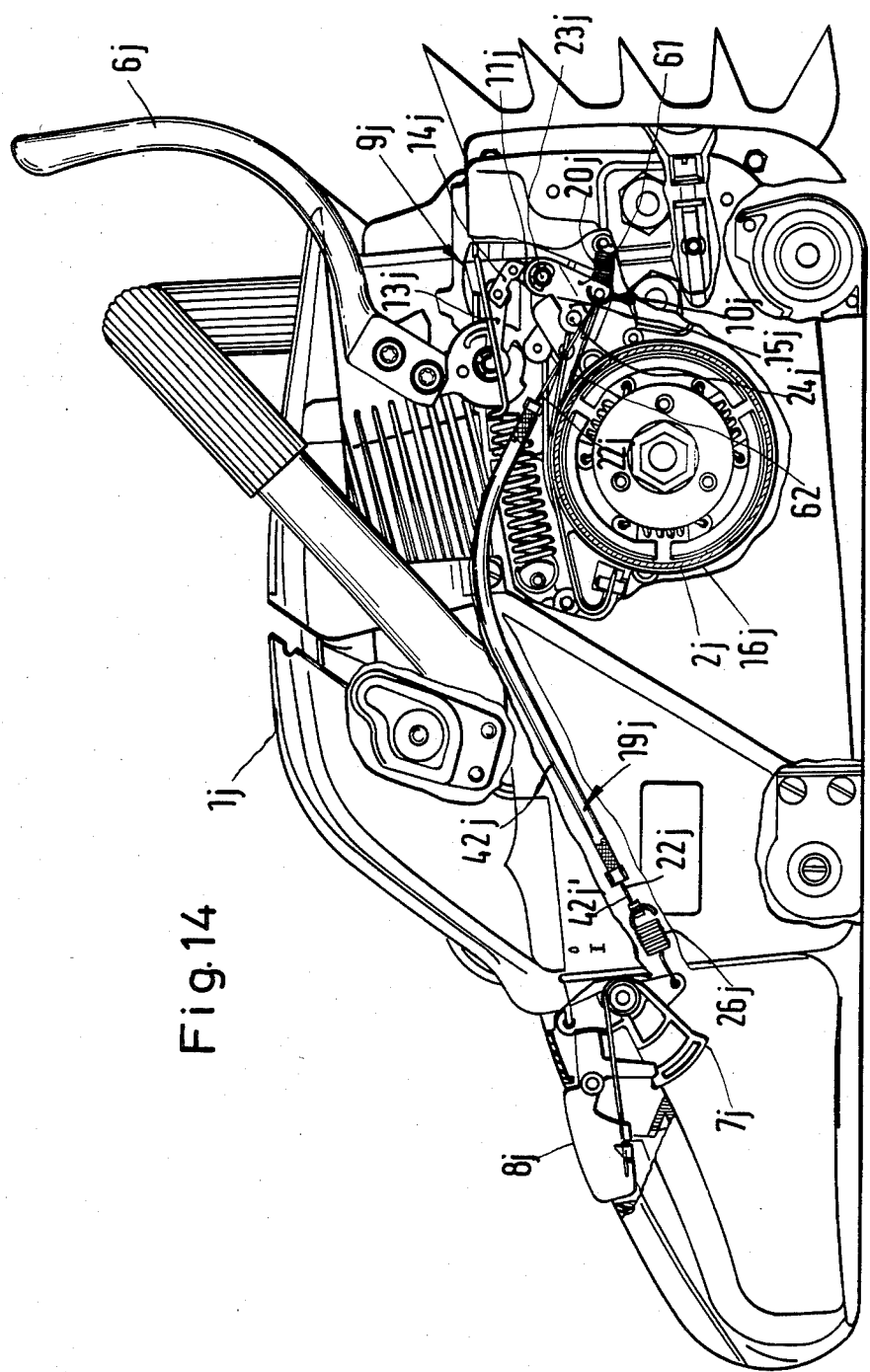

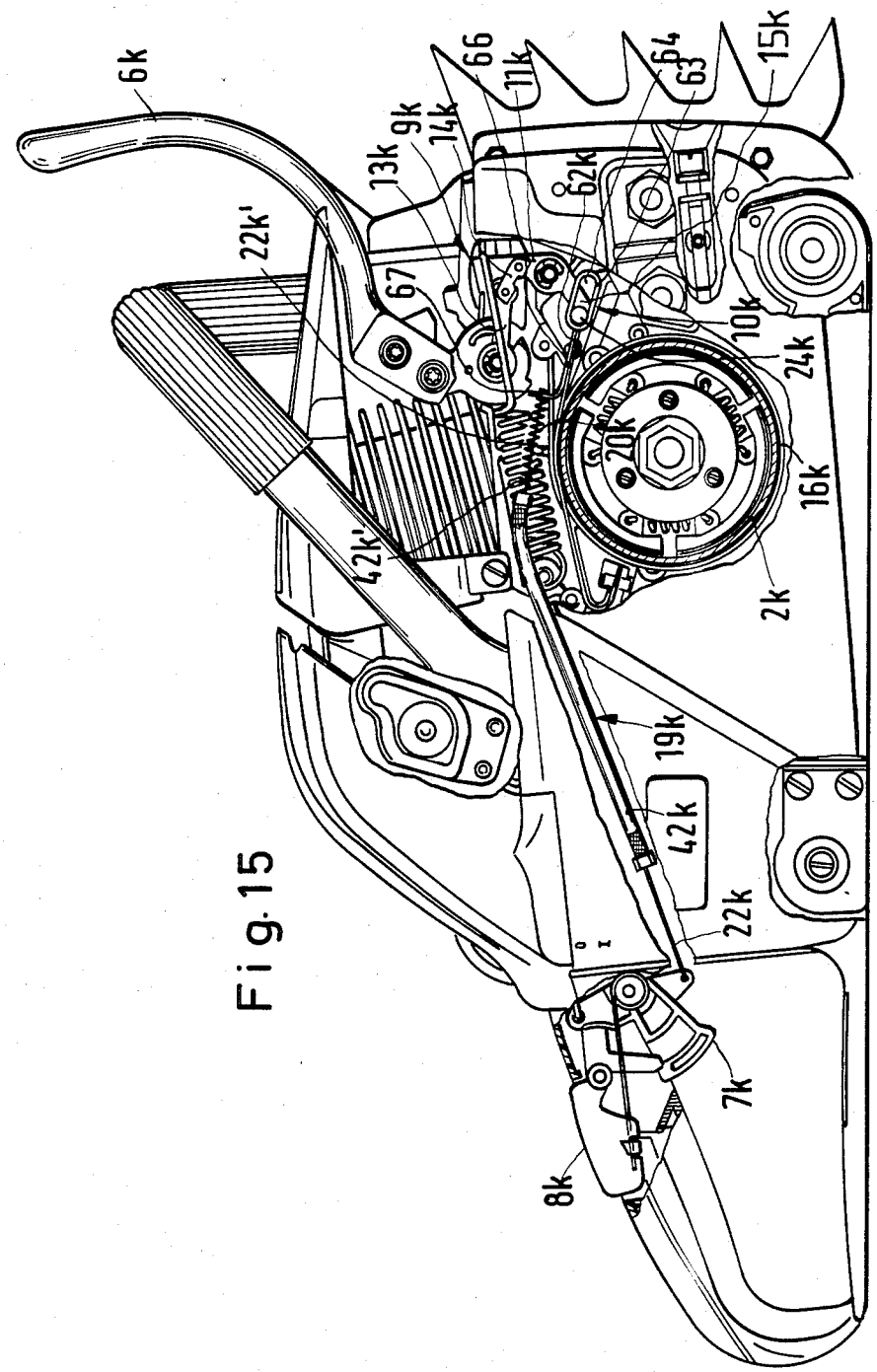

CHAIN SAW HAVING A BRAKING ARRANGEMENT

FIELD OF THE INVENTION

The invention relates to a chain saw having a braking arrangement which includes a latching device for holding a tripping device in the release-ready position against the force of a spring.

BACKGROUND OF THE INVENTION

German published patent application DE-OS No. 2,922,573 discloses a motor-driven chain saw wherein a tension spring is fastened to a brake band lever to allow it to pivot from the release position into a braking position. When the latching device releases the brake band lever, it is pivoted into the braking position by the tension spring. As a result, the brake band is applied to the brake drum, stopping movement of the saw chain. However, the saw chain is only slowed down upon actuation of the tripping device. When working with the motor-driven chain saw, there is the problem that the saw chain continues running for a relatively long period after the throttle is released, about 3.5 to 5 seconds. During such running down of the saw chain, there is the danger that the operator will strike the ground with the guide bar which may easily dull the saw chain and therefore require its premature replacement. In addition, particularly where space is limited, the chain saw operator may sustain injury if the guide bar accidentally touches the legs or other parts of the body.

SUMMARY OF THE INVENTION

It is therefore an object of the invention to configure a motor-driven chain saw of the aforementioned type such that the saw chain can be brought to an immediate stop without the need to operate the chain brake device.

The ancillary chain brake device permits braking the clutch drum immediately when required. This braking operation occurs independently of the main chain brake device, that is, it occurs also if the tripping device is still in the release position. The chain brake device thereby remains in the release position so that it will be effective during operation of the chain saw should, for example, a kickback condition occur while the saw chain is running. Preferably, the ancillary chain brake device is actuable by the throttle lever or the throttle lever locking device of the motor-driven chain saw, such that the clutch drum is braked when the throttle is released. A continued running of the chain is thereby reliably prevented thereby precluding the risk of injury to the operator. Should the guide bar hit the ground accidentally, the saw chain will not be damaged since by then it will already have come to a stop.

Further advantages of the invention will become apparent from the following description, the drawing and the appended claims.

BRIEF DESCRIPTION OF THE DRAWING

The invention will now be described in more detail in the following with reference to the drawing wherein.

DESCRIPTION OF THE PREFERRED EMBODIMENTS OF THE INVENTION

Figure 1:
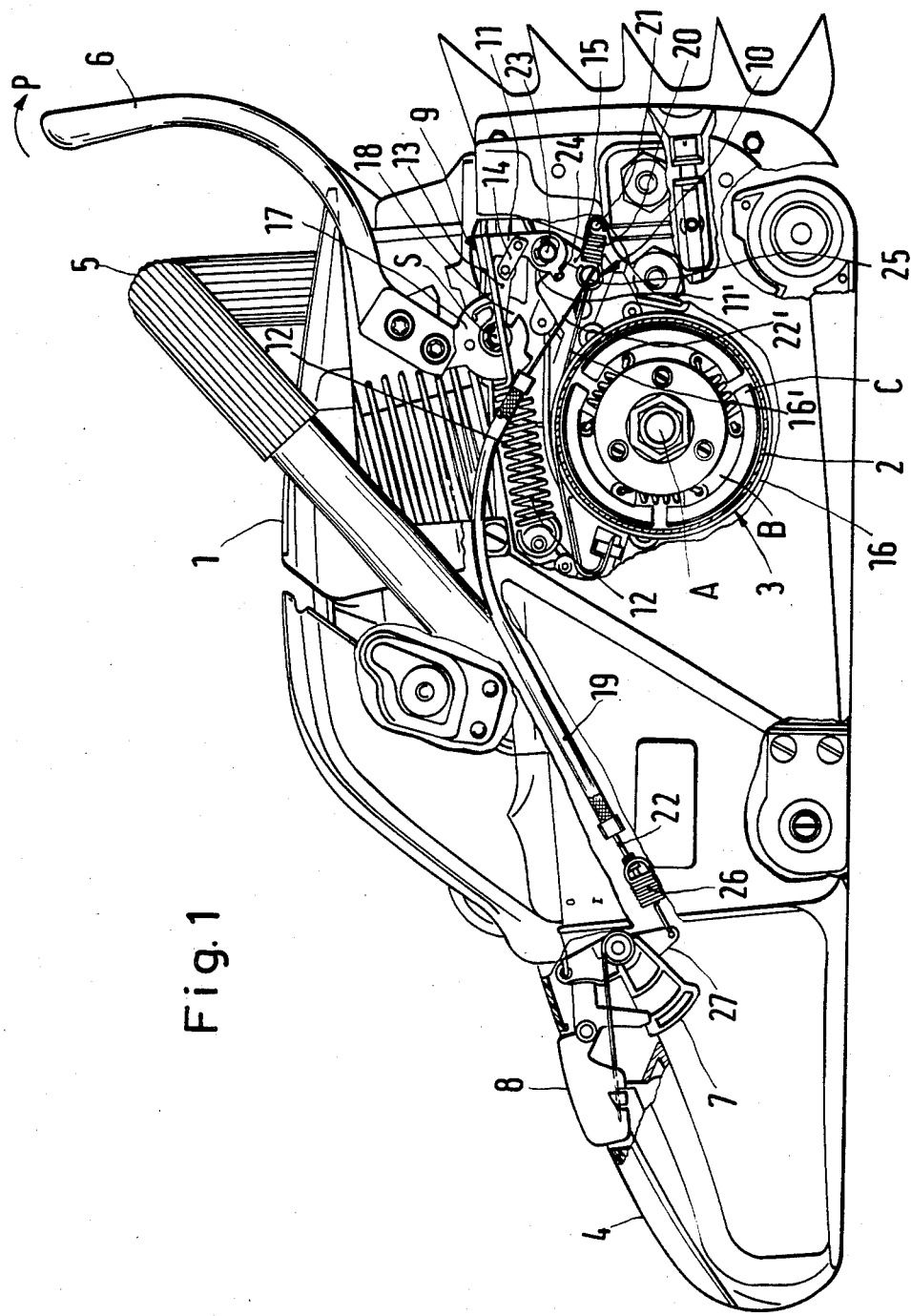
FIG. 1 is a side elevation view of a portable handheld motor-driven chain saw with the side wall of the housing partially cut away to show a chain brake device in the release-ready position and an ancillary chain brake device in the braking position.
Figure 2:
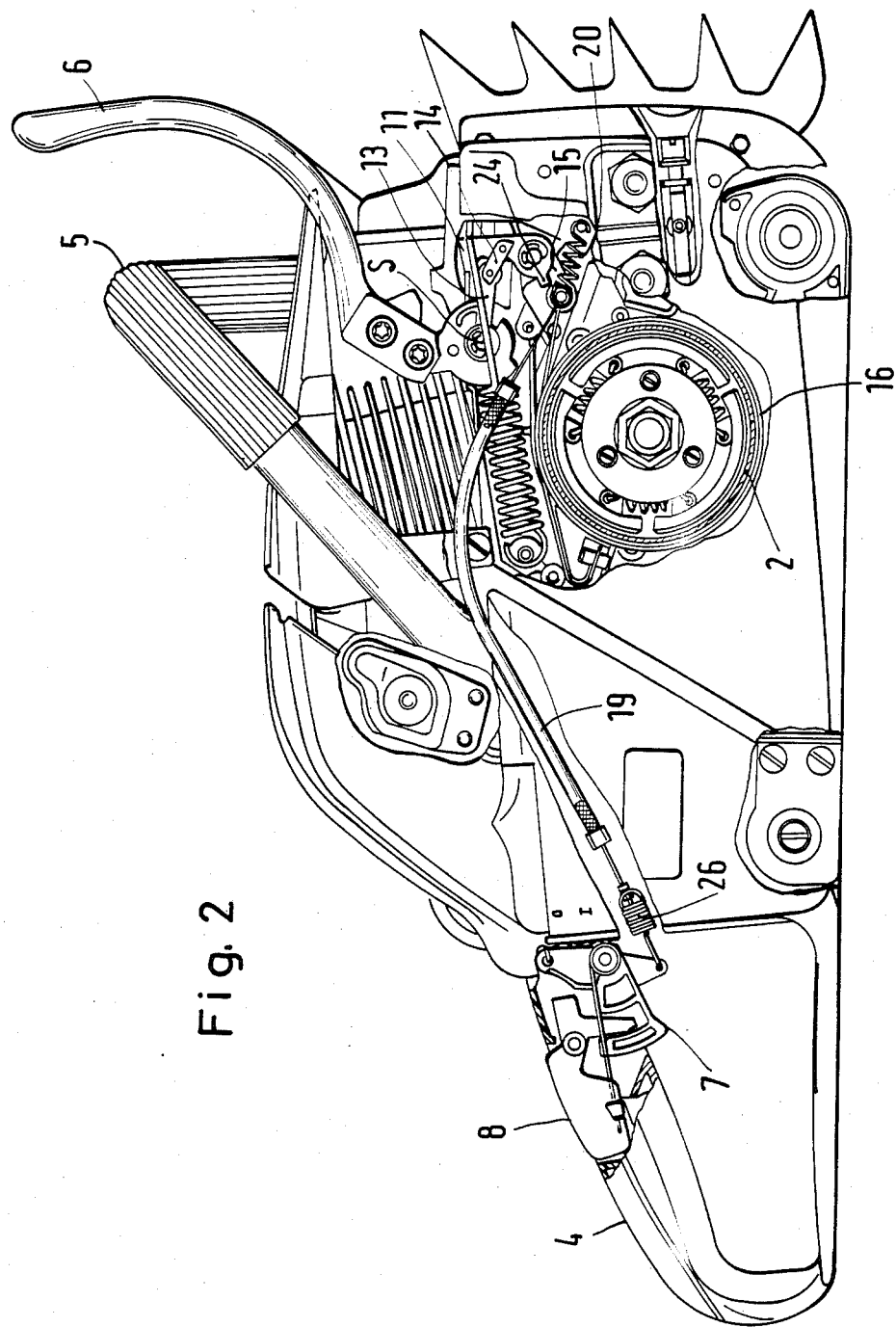
FIG. 2 is a side elevation view of the motor-driven chain saw of FIG. 1 with the chain brake device and the ancillary chain brake device in their respective release-ready positions.
Figure 3:
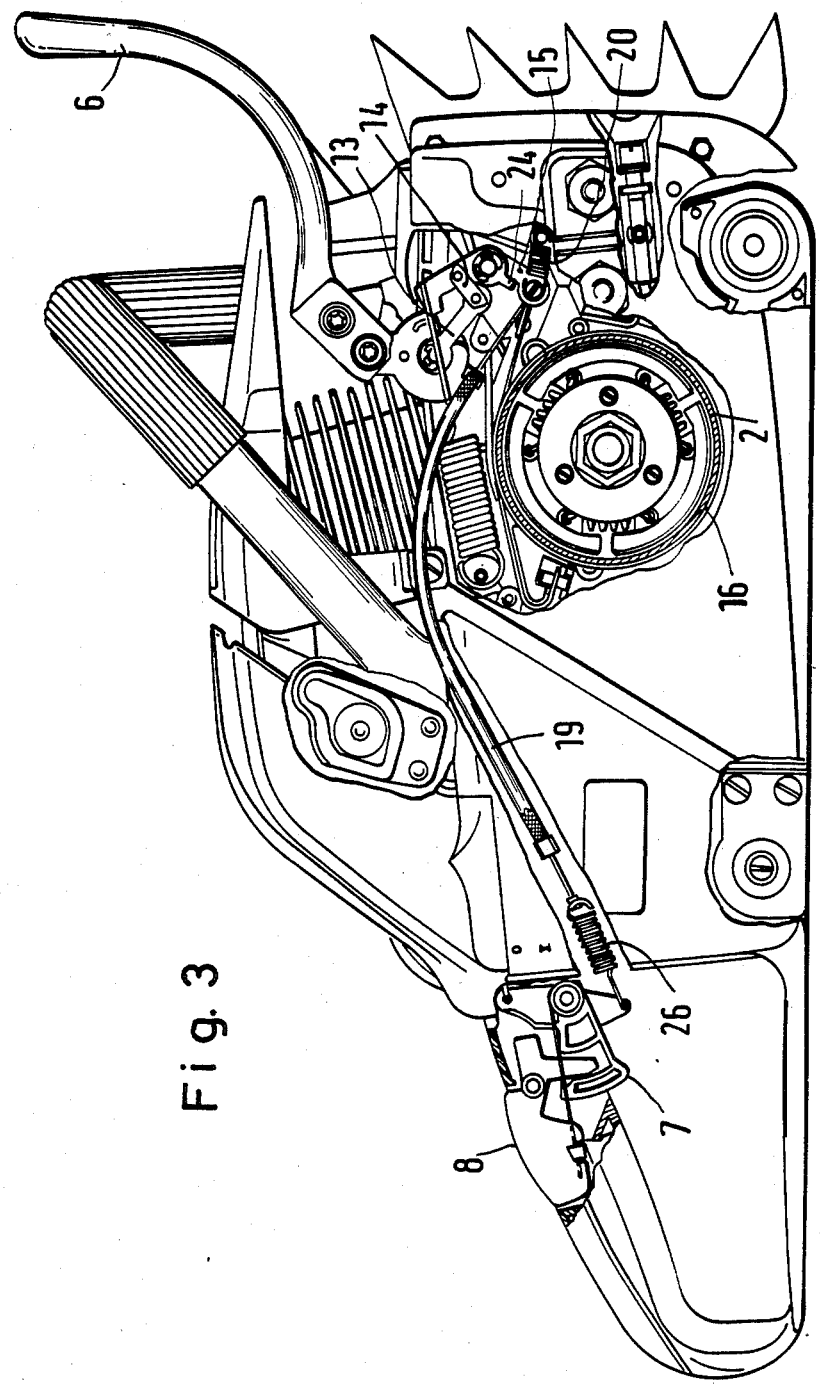
FIG. 3 shows the motor-driven chain saw of FIG. 1 with the chain brake device and the ancillary chain brake device in their respective braking positions.

The motor-driven chain saw illustrated in FIGS. 1 to 3 includes a housing 1 on which a guide bar (not shown) is mounted. An endless saw chain is accommodated on the guide bar. A drive motor is mounted in the housing which in the embodiment shown is an internal combustion engine. A brake or clutch drum 2 of a centrifugal clutch 3 is rotatably mounted in the housing 1 and is connected with a sprocket (not shown) over which the saw chain runs. The clutch drum 2 is rotatably mounted on an engine shaft A on which a centrifugal-weight carrier B is fixedly mounted for rotation therewith. If the rotational speed exceeds a predetermined limit, the centrifugal weights C on the centrifugal-weight carrier will move outwardly and come into contact engagement with the clutch drum 2. The drum 2 rotates with the sprocket and the saw chain is propelled around the guide bar. Mounted on the housing 1 are a rearward handle 4, a forward handle 5 arranged perpendicularly to the latter as well as a hand guard 6 located between the guide bar and the forward handle 5.

A throttle lever 7 and a throttle lever locking device 8 connected thereto are pivotally mounted on the rearward handle 4. In their rest positions, lever 7 and locking device 8 extend upwardly and downwardly, respectively, with respect to the carrying handle 4.

In order to be able to stop the motor-driven chain saw as soon as possible in the event of kickback which may occur easily if, for example, the saw chain should get caught in the wood, the hand guard 6 and the throttle lever 7 are connected with a chain brake device 9 and an ancillary chain brake device 10. The chain brake device 9 will take effect if the throw movements acting on the hand guard 6 in the presence of a kickback condition exceed a predetermined amount; whereas, the ancillary chain brake device 10 will act on the release of the chain brake device 9 and/or the throttle lever 7.

The chain brake device 9 includes a spring lever 11, a tension spring 12, a latching device 13, 14, a brake band lever 15 and a brake band 16 surrounding the clutch drum 2. The brake band 16 is anchored at its end 16' on a bolt 25 at the free end of the single-armed brake band lever 15. The tension spring 12 has its one end secured to the housing 1 while its other end is anchored on the free end of the single-armed spring lever 11. The latching device 13, 14 is made up of a first and a second lever. While lever 13 is pivotally connected to the housing 1, lever 14 is pivotally connected to the spring lever 11 at approximately the center portion thereof. In addition, the two levers 13 and 14 are pivotally connected with one another. The hand guard 6 is rigidly secured to a disc-shaped bearing member 17 which is pivotally mounted about the pivot axis S of the lever 13 on the housing 1. The bearing member 17 has a recess 18 formed in the edge thereof through which the lever 13 extends. The recess 18 has upper and lower edges of which the upper edge is close to the hand guard 6. In the release-ready position (FIG. 1), the bearing member 17 rests with the upper edge of its recess 18 against the lever 13; whereas, the lower edge of recess 18 is at a predetermined angular distance from the lever 13. Lever 13 and the other lever 14 are bent upwardly over the extended position of the latching device 13, 14.

If a throw-back movement of the motor-driven chain saw begins and causes the hand guard 6, which acts as an inert mass, to be tilted in the direction of arrow P in FIG. 1 relative to the upwardly kicking motor-driven chain saw, the force of the hand guard 6 will push the latching device 13, 14 downwardly in the direction of the clutch drum 2 and beyond its extended position, so that the spring lever 11, as a result of the force of the tension spring 12 acting thereon, is pivotally rotated in the counterclockwise direction into its braking position as shown in FIG. 3.

A common bearing pin 23 pivotally supports the end of the brake band lever 15 on the end thereof remote from the clutch drum 2 and the end of the spring lever 11 on the end thereof close to the clutch drum. The bearing end 11' of the spring lever 11 is widened and includes a radially outwardly extending projection 24 serving as a drive dog for the brake band lever 15 when the brake device 9 is released. The abutting engagement between the drive dog 24 and the brake band lever 15 (FIG. 2) causes the latter to be entrained in the counterclockwise direction when the spring lever 11 is pivotally rotated. The brake band 16 is thereby applied to the clutch drum 2.

The ancillary chain brake device 10 has an actuating member which is preferably configured as a Bowden cable 19. One end 22 of the Bowden cable is fastened to the throttle lever 7 and its other end 22' is preferably attached to the bolt 25 of the brake band lever 15 which thus forms part of not only the chain brake device 9 but also of the ancillary chain brake device 10. However, in lieu of the Bowden cable, a pull line, a rod linkage or the like can be used.

The ancillary chain brake device 10 includes a tension spring 20 having its one end attached to the free end of the brake band lever 15 and its other end to a pin 21 formed fast with the housing 1. A spring clip with a tension force of about 10 Joule may be substituted for the tension spring 20. The spring 20 biases the brake band lever 15 counterclockwise into the braking position (FIGS. 1 and 3), so that the brake band 16 is pulled into the braking position when the Bowden cable 19 releases the brake band lever. In order to avoid the condition that reaction forces act on the throttle lever via the Bowden cable and thus on the operator's hand gripping the throttle lever upon the release of the chain brake device 9, a spring member 26, preferably a tension spring, is arranged between the throttle lever and the relevant end 22 of the Bowden cable 19. Injury to the operator's fingers is thereby safely prevented, also in the event of hard braking.

Prior to the operation of the motor-driven chain saw, the hand guard 6 is in the tensioned position shown in FIG. 1 in which also the spring lever 11 with the latching device 13, 14 is held in the release-ready position against the force of the tension spring 12. With the motor-driven chain saw at rest, the throttle lever 7 is not yet pressed down, so that the Bowden cable 19 is not actuated and therefore exerts no force on the brake band lever 15. Therefore, prior to operation of the motor-driven chain saw, the tension spring 20 holds the brake band lever 15 in its braking position as shown in FIG. 1 in which the brake band 16 is in tight contact engagement with the clutch drum 2.

When the motor-driven chain saw is taken into use, the throttle lever 7 is pressed down actuating the Bowden cable 19. As a result, the brake band lever 15, which is connected with the Bowden cable 19, leaves its braking position by being pivotally rotated clockwise about the pivot pin 23 against the force of the tension spring 20 to assume the release position shown in FIG. 2. The brake band 16 is thereby lifted clear of the clutch drum 2 to permit the latter to rotate freely. The positions of the chain brake device 9 and the ancillary chain brake device 10 shown in FIG. 2 correspond to the positions they are in during operation of the motor-driven chain saw.

Due to the two-part configuration of the spring lever 11 and the brake band lever 15 and the ancillary chain brake device 10, releasing the throttle lever 7 causes the brake band lever 15 to again be relieved of load via the Bowden cable 19. The tension spring 20 then takes full effect and pivots the brake band lever 15 back into its braking position (FIG. 1) in which the brake band 16 engages the brake drum 2 thereby bringing it to an immediate stop. Accordingly, the brake band 16 can be released or brought into the braking position independently of the hand guard 6, which is in the release-ready position, by means of the ancillary chain brake device 10 by opening or closing the throttle. By contrast to a pure chain braking operation for which only the chain brake device 9 is provided, this affords the advantage of a substantially smoother braking when the throttle is released.

When the ancillary chain brake device 10 is operated, all parts of the chain brake device 9, with the exception of the brake band lever 15, are in their rest and release-ready positions (FIGS. 1 and 2). The ancillary chain brake device 10 particularly prevents the follow-on running of the saw chain since it is braked immediately after releasing the throttle. The spring 20 is dimensioned so that it can reliably bring the brake band 16 into contact engagement with the clutch drum 2 and yet generate only a minor counterforce when the throttle lever 7 is actuated.

In the event of a kickback of the motor-driven chain saw while in operation, the braking action is released via the chain brake device 9. The hand guard 6, as a result of its inertia, is then thrown forwardly in the direction of arrow P (FIG. 1) thereby assuming the position shown in FIG. 3. The lever 13 is entrained by the bearing member 17 acting as a drive dog, so that the lever 13 is pushed downwardly together with the lever 14 beyond the dead point of the latching device 13, 14. As a result, the spring lever 11 is unlatched so that it pivots counterclockwise into its braking position under the force of the tension spring 12. The spring lever 11 entrains the brake band lever 15 with its drive dog. The tension spring 20 thereby takes full effect, that is, it supports the contact engagement of the brake band 16. The brake band is then placed firmly around the clutch drum 2 (FIG. 3) thereby causing it to come to a halt. In the braking action, the energy stored by tensioning of the tension spring 12 in the release-ready position is released, which results in a powerful braking of the motor-driven chain saw.

A spring 26 is held between the Bowden cable 19 and the throttle lever 7 or a lug 27 projecting over this lever. In the braking process, the spring 26 absorbs the force acting on the brake band lever 15 so that the throttle lever 7 is not pivoted back into its rest position abruptly but remains in its instantaneous position during the full braking without impairing the braking action. The tension spring 20 is dimensioned such that it does not impair the application of the brake band 16 to the clutch drum 2 by means of the hand guard 6 and the tension spring 12.

Figure 4:
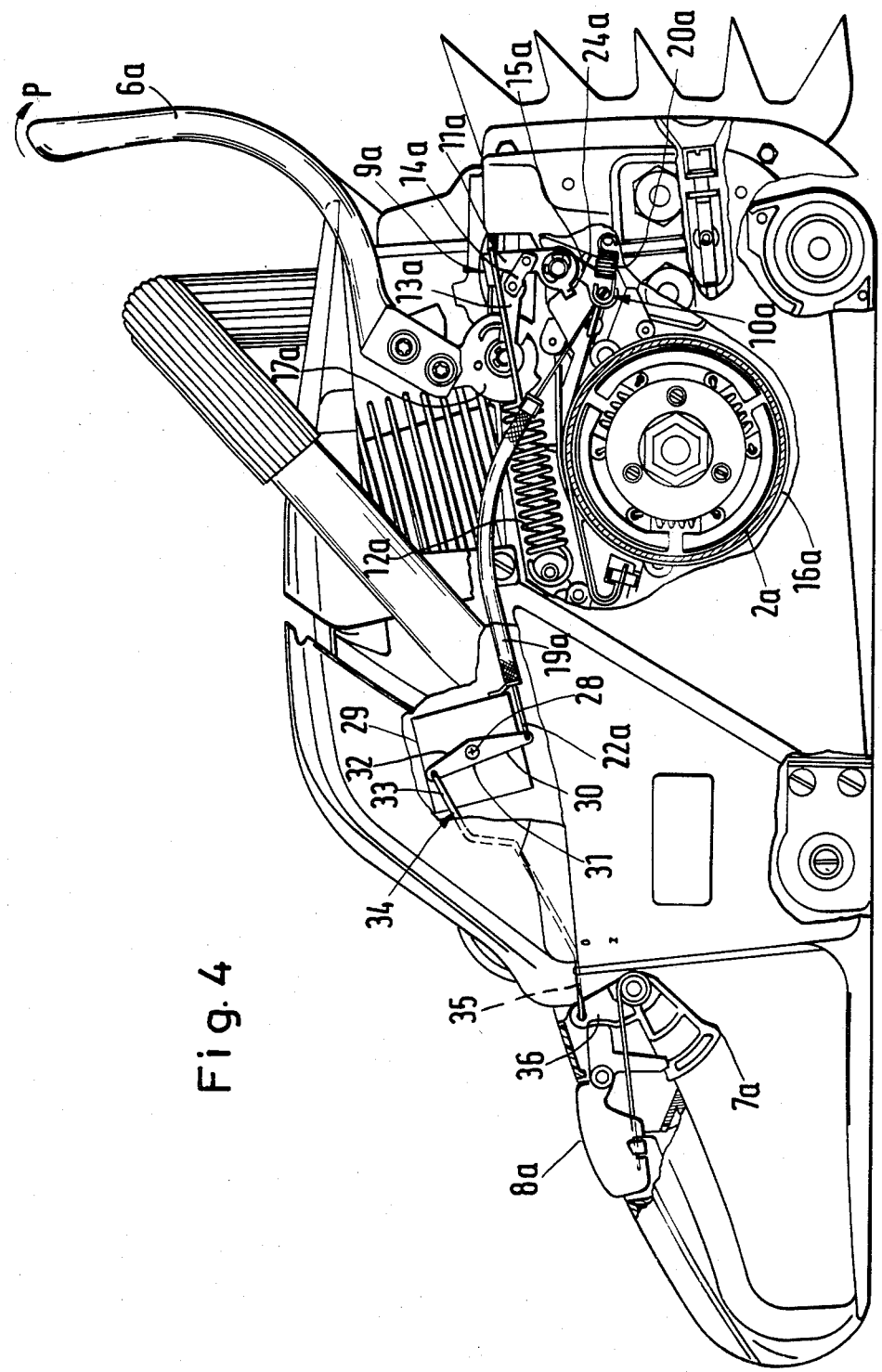
FIGS. 4 to 8 show further embodiments of the braking arrangement of the invention for a motor-driven chain saw in a representation according to FIG. 1.

The embodiment of FIG. 4 differs from the embodiment previously described in that the ancillary chain brake device 10a is not controlled by the throttle lever 7a directly but via a throttle-flap shaft 28 of a throttle flap (not shown) of a carburetor 29 of the motor-driven chain saw. In this arrangement, the Bowden cable 19a is fastened to the carburetor 29 and its pull wire 22a is articulately connected to an arm 30 of a two-armed lever 31, the latter being mounted on the throttle-flap shaft 28. Fastened to the other arm 32 of the lever 31 is an end 33 of a push rod 34 which has its other end 35 hooked onto a lug 36 of the throttle lever 7a.

At its end close to the brake band lever 15a, the Bowden cable 19a is supported on a stop (not shown) formed on the housing. In the event of a kickback of the motor-driven chain saw in which the chain brake device 9a is released via the hand guard 6a, the arrangement of the Bowden cable 19a between the brake band lever 15a and the lever 31 of the throttle flap permits the Bowden cable 19a to be actuated by the entrainment of the brake band lever 15a by means of the drive dog 24a of the spring lever 11a. In the event of a braking, the lever 31 is thereby pivoted counterclockwise and the throttle flap is closed immediately. The motor-driven chain saw is thus turned off instantly and the clutch drum 2a is braked. The addition of interrupting the ignition spark thus represents a further safety measure to ensure that the saw chain is braked.

In order to bring the chain brake device 9a back into its release-ready position, the hand guard 6a is pivotally rotated back in a direction opposite to arrow P as in the previous embodiment. The bearing member 17a of hand guard 6a entrains the two levers 13a and 14a and brings them into their initial positions shown in FIG. 4. The spring lever 11a is pivoted in the clockwise direction against the force of the tension spring 12a. The position of the brake band lever 15a remains unchanged because in this direction of movement of the spring lever 11a its drive dog 24a is not effective. Therefore, the brake band 16a continues to be applied to the clutch drum 2a. Only when the throttle lever 7a and thus the push rod 34 and the Bowden cable 19a are actuated will the brake band lever 15a be pivoted in the clockwise direction against the force of the spring 20a and lift the brake band 16a clear of the clutch drum 2a.

If the throttle lever 7a is pressed down at the same time as the hand guard 6a is pivoted back, the brake band lever 15a, immediately after being released by the spring lever 11a, is pivoted in the clockwise direction by the Bowden cable 19a and the brake band 16a is lifted clear of the clutch drum 2a.

Figure 5:
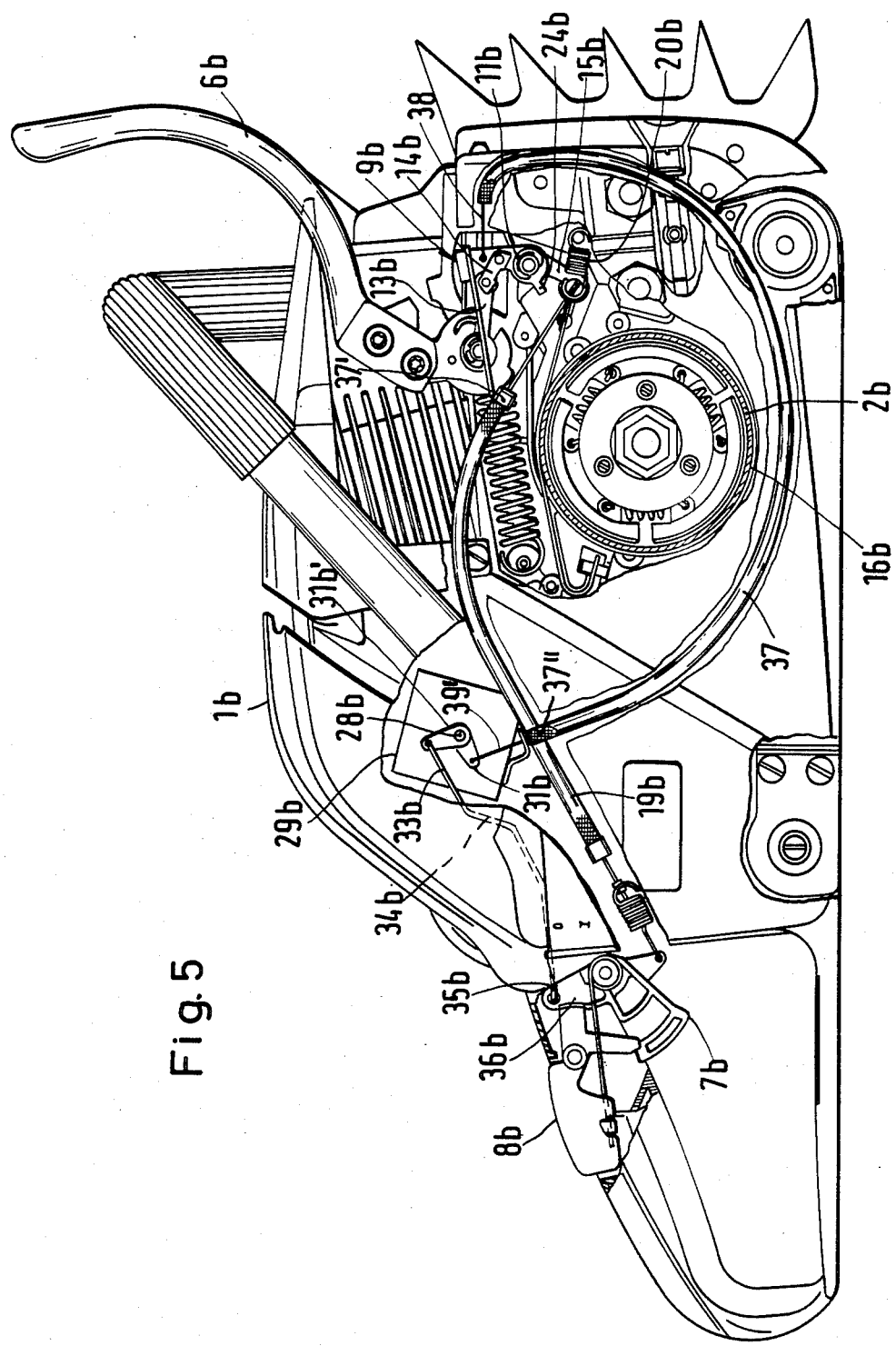

In the motor-driven chain saw of FIG. 5, the Bowden cable 19b is arranged directly between the throttle lever 7b and the brake band lever 15b as in the embodiment of FIGS. 1 to 3. However, the chain brake device 9b is connected with an additional Bowden cable 37 or another pulling mechanism such as a pull wire, rod linkage or the like. The casing ends 37' and 37" of the Bowden cable are supported on the housing 1b and the carburetor 29b, respectively. The end 39' of the casing of the Bowden cable 37 on the side close to the carburetor 29b is connected with a first single-armed lever 31b which is seated on the throttle-flap shaft 28b. Immediately adjacent to this lever 31b, a second single-armed lever 31b' is seated on the throttle-flap shaft 28b. An end 33b of the push rod 34a is hooked into the lever 31b. As in the embodiment of FIG. 4, the other end 35b is fastened to a lug 36b of the throttle lever 7b. The levers 31b and 31b' are each connected with the throttle-valve shaft 28b by means of a ratchet-type connection such that a counterclockwise movement of the first lever 31b causes the latter to rotate with the throttle-flap shaft and a clockwise movement of the second lever 31b' causes the latter to rotate with the throttle-valve shaft.

The end 38 of the Bowden cable 37 is secured to the spring lever 11b above the lever 14b of the latching device 13b, 14b. On release of the chain brake device 9b via the hand guard 6b, not only the brake band 16b is applied to the clutch drum 2b in the manner described, but also the throttle flap of the carburetor 29b is closed by the actuation of the Bowden cable 37 with the pivoting of the spring lever 11b. This causes the first lever 31b to pivotally rotate, which in this direction of rotation is connected with the throttle flap so as to rotate therewith, so that the throttle flap is rotated in the closing direction. At the same time, the second lever 31b' remains at rest because in this direction of rotation the throttle-flap shaft is freely rotatable relative to the lever 31b'. As a result, no reaction forces act on the depressed throttle lever 7b. As in the previous embodiments, the brake band 16b is released in that the hand guard 6b is pulled backwardly in the counterclockwise direction from the braking position into the release position shown in FIG. 5. The levers 13b and 14b and the spring lever 11b are entrained and bring the tension spring 12b into its release-ready position. The spring lever 11b is freely pivotable relative to the brake band lever 15b and the drive dog 24b is not in contact engagement with the brake band lever. Accordingly, the brake band lever 15b retains its braking position provided that the throttle lever 7b is not actuated at the same time. The drive dog 24b is then at such an angular spacing from the brake band lever 15b that it can be pivoted into its release position. If, with the hand guard 6b pulled back, the throttle lever 7b is then depressed to open the throttle, the Bowden cable 19b will pivot the brake band lever 15b clockwise from the braking position shown into the release-ready position. In the embodiments of FIGS. 4 and 5, the carburetor throttle flap is controlled directly by the throttle lever.

Figure 6:
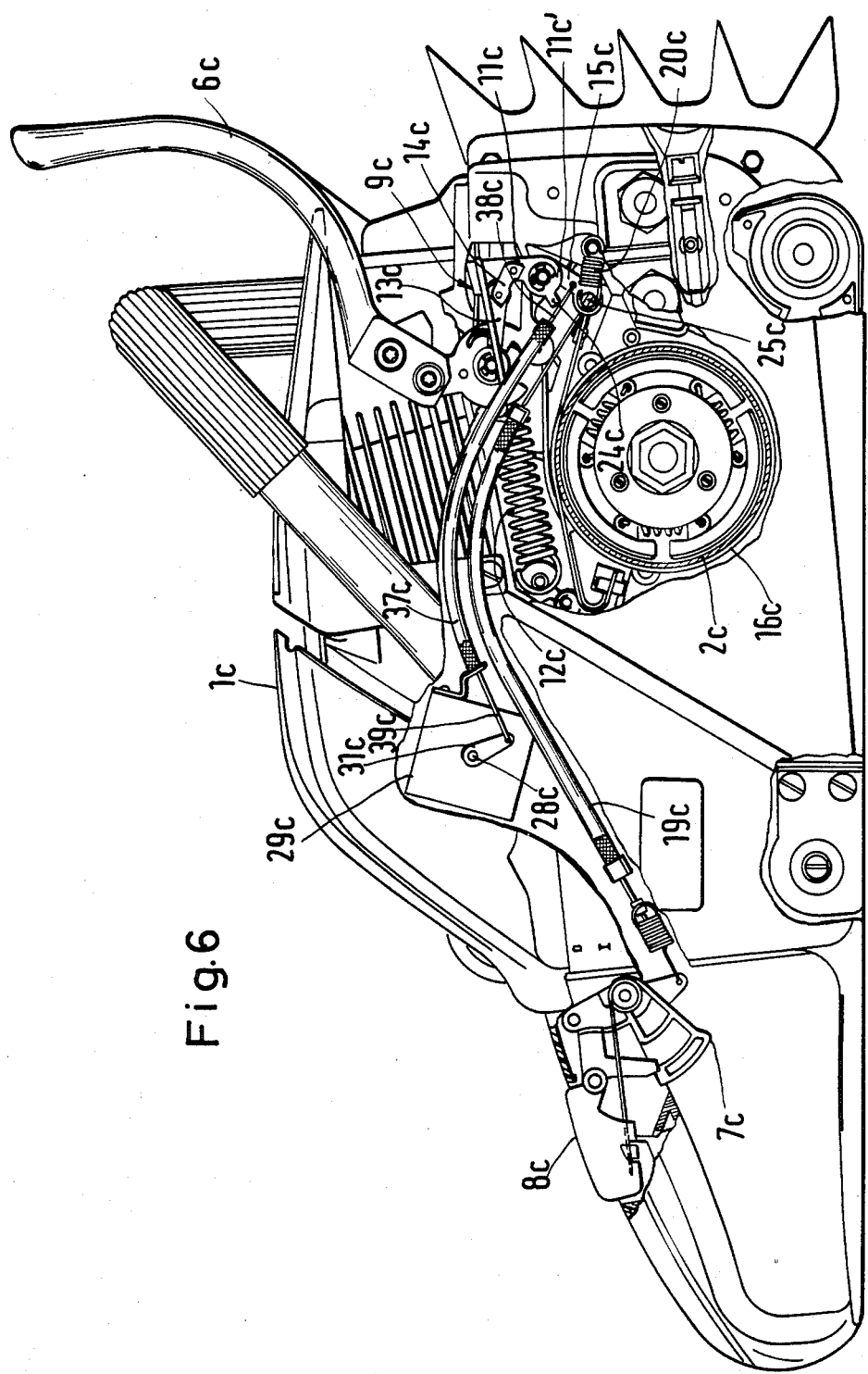

In the motor-driven chain saw of FIG. 6, the safety of the tool is still further increased by operatively connecting the throttle valve of the carburetor 29c with the throttle lever 7c not directly but via the Bowden cable 19c and an additional Bowden cable 37c. In lieu of the latter, a tension cable, rod linkage or the like can be used. The casing of the Bowden cable 37c is supported on the housing 1c and on the carburetor 29c. Its one cable end 39c is connected with a single-armed lever 31c which is seated on the throttle-flap shaft 28c. The other cable end 38c of the Bowden cable 37c is fastened to the brake band lever 15c between the spring lever end 11c' and the anchoring bolt 25c. In accordance with the embodiment of FIGS. 1 to 3, the Bowden cable 19c is arranged between the throttle lever 7c and the brake band lever 15c.

Upon actuating the throttle lever 7c, the brake band 16c is released by actuation of the Bowden cable 19c as described with reference to the embodiment of FIGS. 1 to 5. The pivoting clockwise movement of the brake band lever 15c actuates the Bowden cable 37c connected thereto which then rotates the throttle flap lever 31c such as to open the throttle flap. This sequence of operations occurs with the chain brake device 9c tensioned, that is, in the release-ready position.

With actuation of the hand guard 6c, which occurs for example if the motor-driven chain saw is subjected to kickback action, the latching device 13c, 14c, the tension spring 12c, the spring lever 11c with its drive dog 24c and the brake band lever 15c are all released in the manner described, whereby the brake band 16c is pulled tightly around the clutch drum 2c. At the same time, the throttle flap is closed via the Bowden cable 37c which reduces the braking time considerably more because the chain brake device 9c need only overcome the stored energy of the gyrating mass and not also the residual engine torque as was previously the situation.

Figure 7:
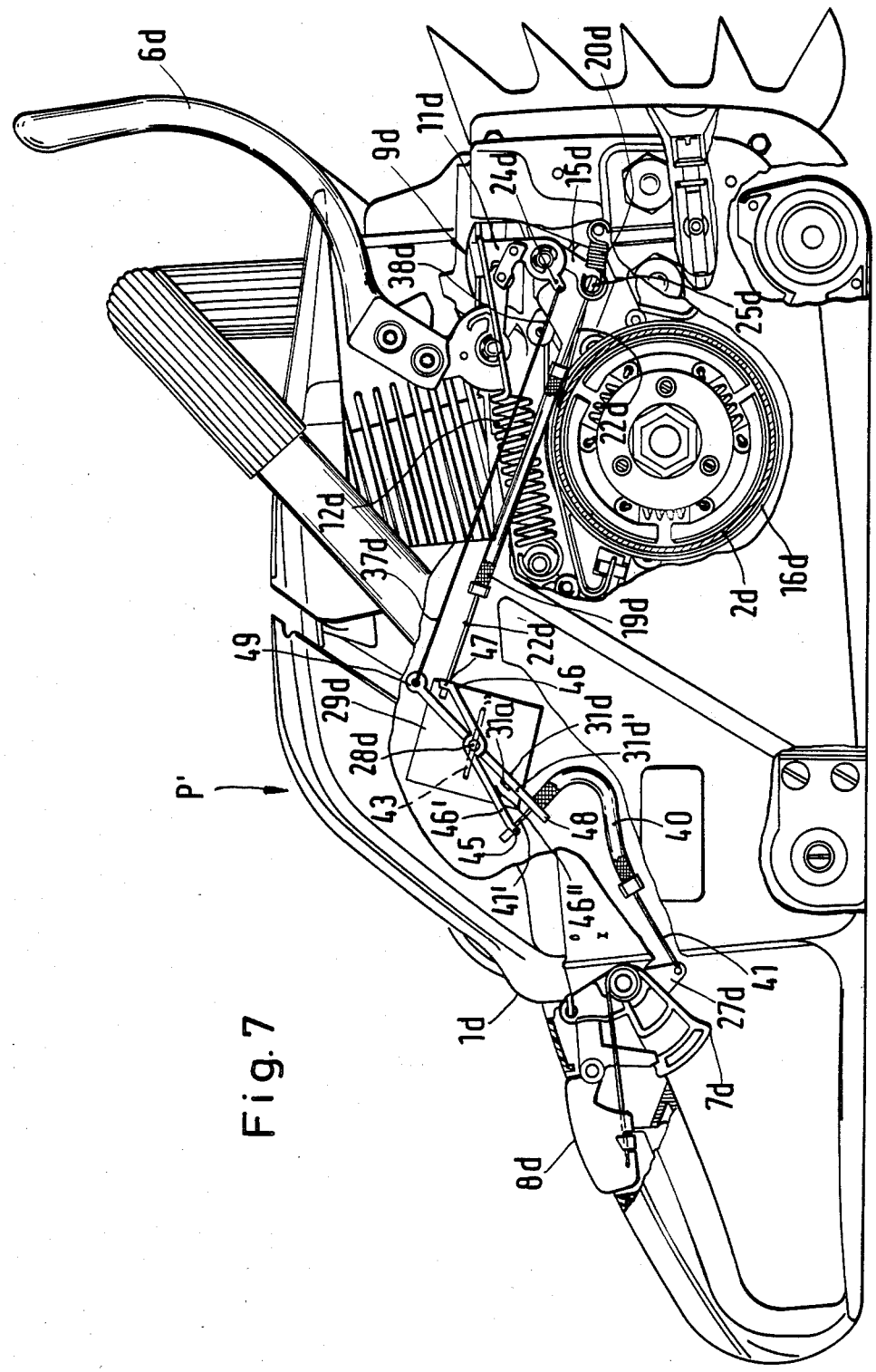

In the embodiment of FIG. 7, the throttle flap 43 is controlled via a Bowden cable 40 which is arranged between the throttle lever 7d and the carburetor 29d and has its one end 41 connected to a lug 27d of the throttle lever 7d and its other end 41' is connected to an end 45 of a two-armed throttle flap lever 46. The lever 46 is mounted on the throttle valve shaft 28d at mid length and preferably extends with both of its ends 45, 47 beyond the carburetor 29d. The end 22d of the Bowden cable 19d on the side close to the carburetor is connected to the lever end 47 while its other end 22d is attached to the brake band lever 15d on a bolt 25d according to the embodiment of FIGS. 1 to 3. The Bowden cable 19d is supported on the housing 1d of the motor-driven chain saw. Another lever 31d is seated on the throttle flap shaft 28d next to the lever 46 and has ends 48, 49 which likewise extend beyond the carburetor 29d. A supplementary rod link 37d or a similar pull mechanism is connected to the lever end 49 remote from the Bowden cable 40. The other end 38d of rod link 37d is connected to a drive dog 24d of the spring lever 11d.

The throttle flap lever 46 is secured to the throttle-flap shaft 28d so as to rotate therewith; whereas, the supplementary lever 31d is loosely seated thereon. At their arms 31d' and 46' close to the throttle lever 7d, the levers 31d and 46, respectively, have respective stops 31a" and 46" which face each other and are preferably formed by projections or the like directed towards each other. On release of the chain brake device 9d, stop 31d" entrains the throttle flap lever 46 by moving into abutment with its stop 46".

Opening of the throttle flap 43 is accomplished via the Bowden cable 40 in that the throttle flap lever 46 pivotally rotates in the counterclockwise direction until it is approximately congruent with the supplementary lever 31d. The lever 46 is then approximately in the same position as the supplementary lever 31d in FIG. 7. However, the supplementary lever 31d is not pivoted in the process since the throttle-flap shaft 28d is freely movable relative to the supplementary lever. As the throttle flap lever 46 is pivoted, the Bowden cable 19d moves the brake band lever 15d clockwise into its inactive position until it abuts with the drive dog 24d of the spring lever 11d, whereby the brake band 16d is released.

When the chain brake device 9d is released via the hand guard 6d, the spring lever 11d and the tension spring 12d are pivoted into their braking positions. The drive dog 24d of the spring lever 11d simultaneously actuates the rod link 37d which thereby rotates the supplementary lever 31d in the clockwise direction. As a result, the stop 31d" of the supplementary lever 31d abuts the stop 46" of the throttle flap lever 46 so that it is pivoted clockwise together with the throttle flap 43 which is thereby closed. The throttle flap lever 46 subsequently resumes its initial position as shown in FIG. 7. At the same time, pivoting of the spring lever 11d via its drive dog 24d also causes the brake band lever 15d to be pivoted into the braking position as shown in FIG. 7, as a result of which the brake band 16d engages the clutch drum 2d and stops it immediately. The Bowden cable 40 is configured such that the return movement of the throttle flap lever 46 is also possible with the throttle lever 7d pressed down. This is accomplished by providing the Bowden cable 40 with a suitably extended length so that it is only stretched when the throttle flap lever pivotally rotates to the position shown in FIG. 7.

After the throttle flap is closed, the engine continues to run at idle while the throttle lever 7d is disabled. Consequently, the engine cannot be revved up beyond idling speed with the brake device 9d released which considerably reduces the risk of an accident.

Figure 8:
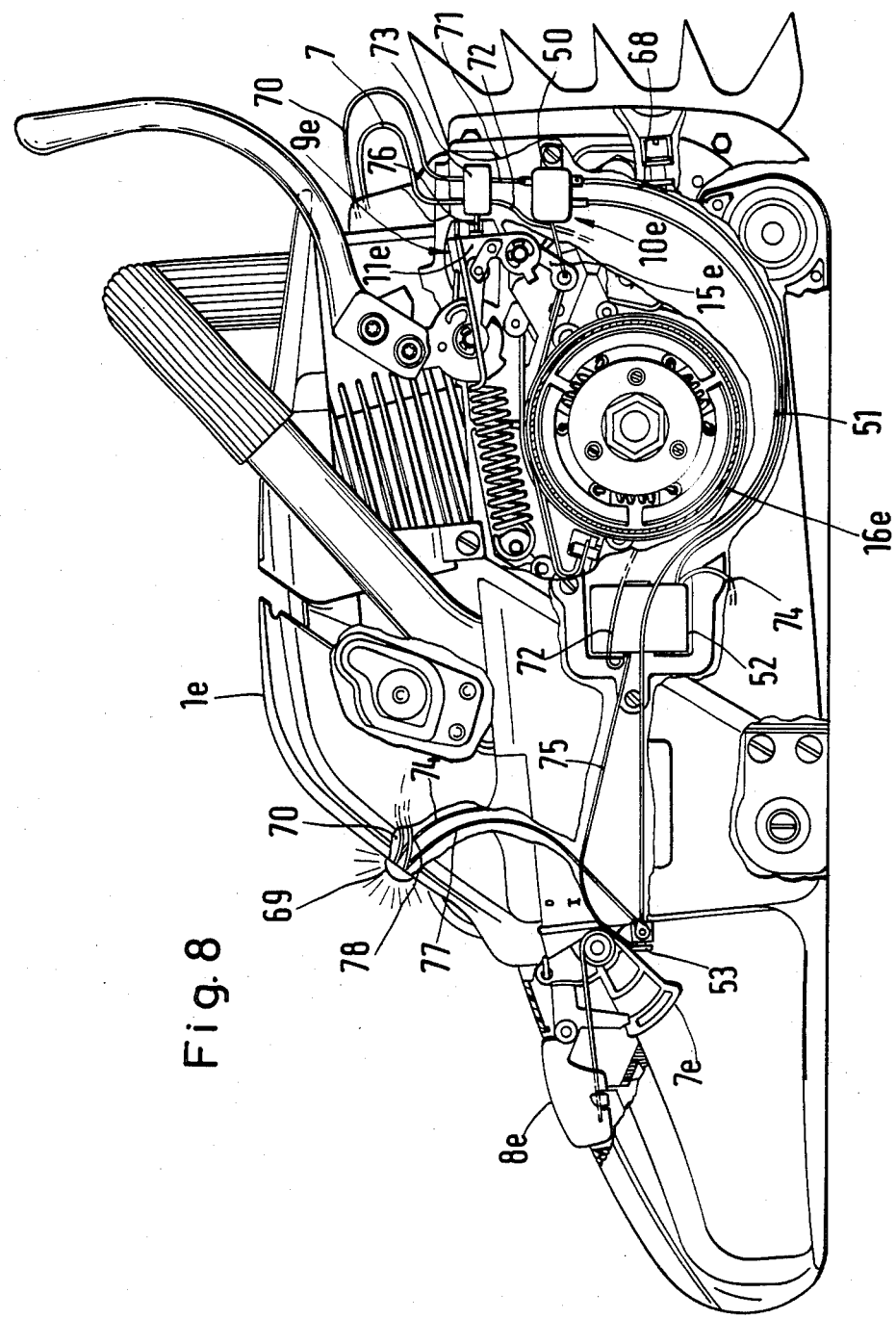

As shown in FIG. 8, it is also possible to use the impact of an electromagnetic force for moving the brake band lever 15e into its braking position. To this end, a small electromagnet 50 controlled by the throttle lever 7e via an electric line 51 and energized by an ignition coil 52 is provided in lieu of the tension spring 20 of FIGS. 1 to 7. Another line 68 connects the ignition coil 52 to the magnet 50.

Throttle lever 7e has an end contact 53 closing a circuit when the throttle lever is released thereby energizing the electromagnet 50. This causes the brake band lever 15e to pivot counterclockwise and pull the brake band 16e into the braking position shown. In this manner, a small amount of force initiates a gentle braking action. As soon as the throttle is opened again, the circuit is interrupted, whereby the magnet 50 is returned to its initial position by a small spring (not shown) so that the brake band 16e is again released. This embodiment affords the advantage that no mechanical actuating forces act on the throttle lever 7e so that the ancillary chain brake device 10e is operated accurately and reliably by means of the electromagnet 50 and the ignition coil 52.

In this embodiment, the position in which the chain brake is at a given moment can be indicated by an electrical indicating device 69. The device 69 includes a lamp mounted on the housing 1e from which a line 70 leads to a contact switch 73. The contact switch 73 is in contact with the spring lever 11e via an actuator 76. The contact switch 73 is fixedly mounted in the housing close to the magnet 50 and is connected to the latter by a line 71. The contact switch 73 is further connected to the ignition coil 52 by means of a line 72. The ignition coil 52 is connected to the lamp 69 by a line 74 and to the end contact 53 by another line 75. Finally, the lamp 69 is connected to lines 77 and 78 which connects with the line 51 leading to the magnet 50 and the contact switch 73. On release of the chain brake device 9e, the contact switch 73 closes the current circuit so that the lamp 69 will light.

Figure 9:
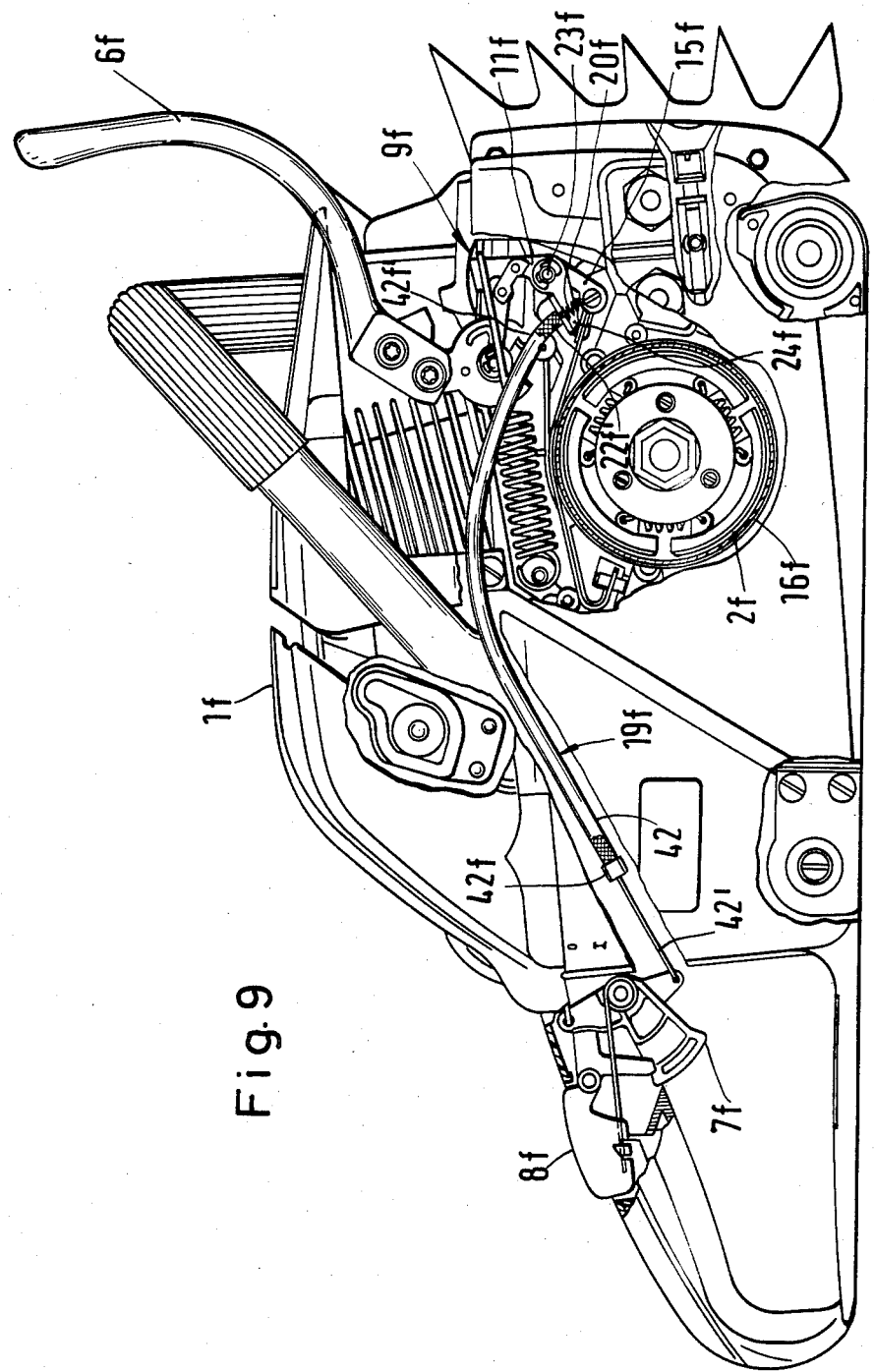
FIG 9 shows another embodiment of the braking arrangement of the invention for a motor-driven chain saw of the invention in a representation according to FIG. 1.
Figure 10:
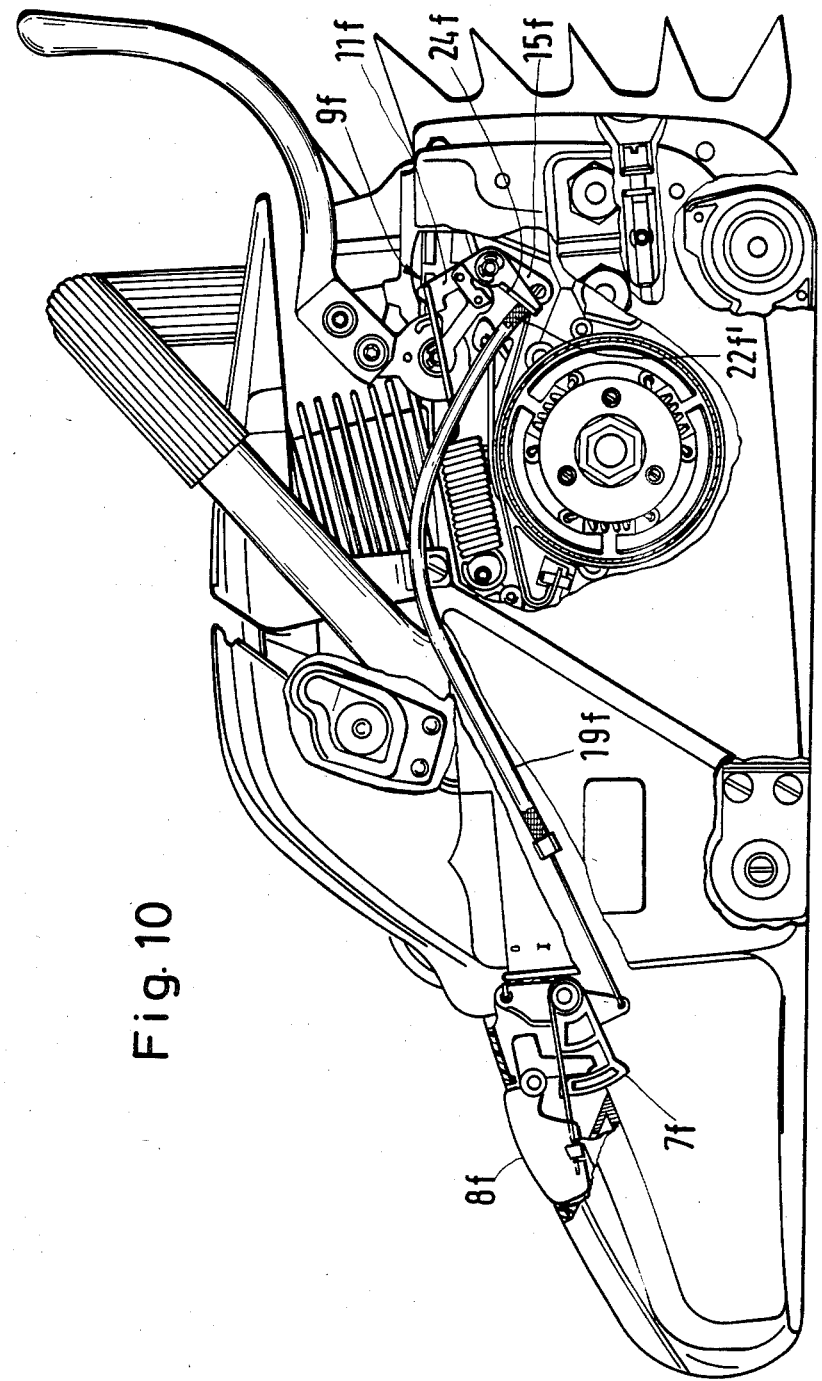
FIG. 10 shows the motor-driven chain saw of FIG. 9 in a representation according to FIG. 3.

The motor-driven chain saw of FIGS. 9 and 10 differs from the one of FIGS. 1 to 3 merely in that the end 42f of casing 42 of the Bowden cable 19f is supported on housing 1f and the other end 22f of casing 42 is supported on the drive dog 24f of the spring lever 11f; whereas, the pull member 42' of the Bowden cable is secured to the brake band lever 15f and the throttle lever 7f. On release of the chain brake device 9f, the spring lever 11f acts on the brake band lever 15f (FIG. 10) as in the embodiment of FIGS. 1 to 3, so that the lever 15f is pivoted into the braking position shown.

As shown in the embodiment of FIG. 9, the spring 20f, which loads the brake band lever 15f in the braking position, is arranged on the end 22f of the pull member 42' between the brake band lever 15f and the drive dog 24f. As a result of this configuration, the spring 20f may be a compression spring. On actuation of the throttle lever 7f, the pull member 42' of the Bowden cable 19f pivots the brake band lever 15f clockwise in opposition to the force of the compression spring 20f and the brake band 16f is lifted clear of the clutch drum 2f. When the throttle lever 7f is released, the force of the compression spring 20f causes the brake band lever 15f to be pivoted counterclockwise so that the brake band 16f is applied to the clutch drum 2f.

If the chain brake device 9f is released by the hand guard 6f, the spring lever 11f is pivoted counterclockwise as described. Via its drive dog 24f, the spring lever 11f causes the brake band lever 15f to pivot in the counterclockwise direction whereby the brake band 16f is applied to the clutch drum 2f. Because the Bowden cable casing 42 is supported on the drive dog 24f and the housing 1f and consequently is only stretched when the spring lever pivots, the Bowden cable 19f has some overlength so that no reaction forces act on the throttle lever 7f or the operator's fingers. The compression spring 20f of this embodiment eliminates the need for the balance spring 26 (FIGS. 1 to 3) between the throttle lever 7 and the end 22 of the Bowden cable. The spring lever 11f is configured as a two-armed lever, with the lever arm, which extends downwardly over its pivot pin 23f in the drawing, forming the drive dog 24f.

Figure 11:
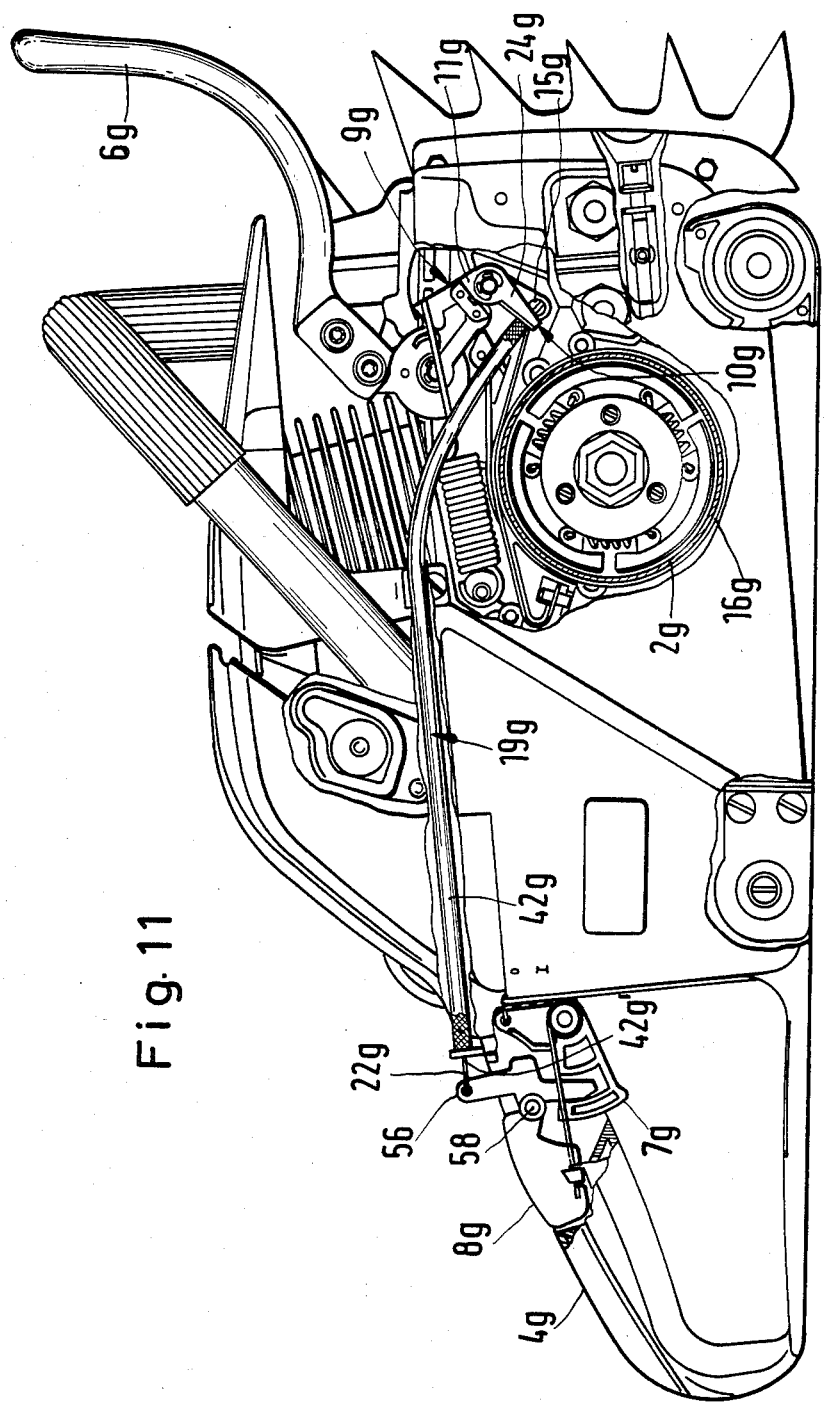
FIGS. 11 to 13 show further respective embodiments of the braking arrangement of the invention for a motor-driven chain saw of the invention in a representation according to FIG. 3; and, FIGS. 14 and 15 show two further embodiments of the braking arrangement of the invention for a motor-driven chain saw of the invention in a representation according to FIG. 1.
Figure 12:
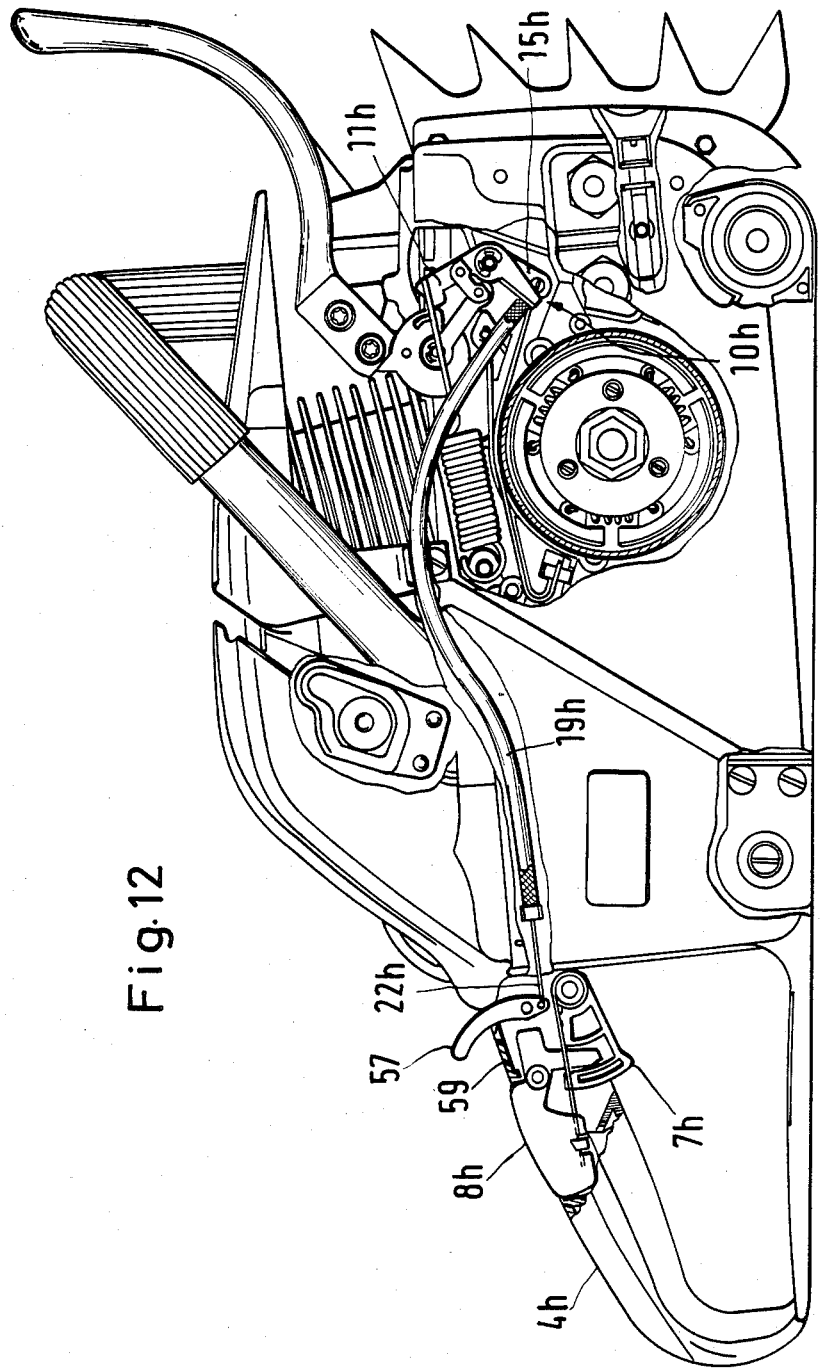
Figure 13:
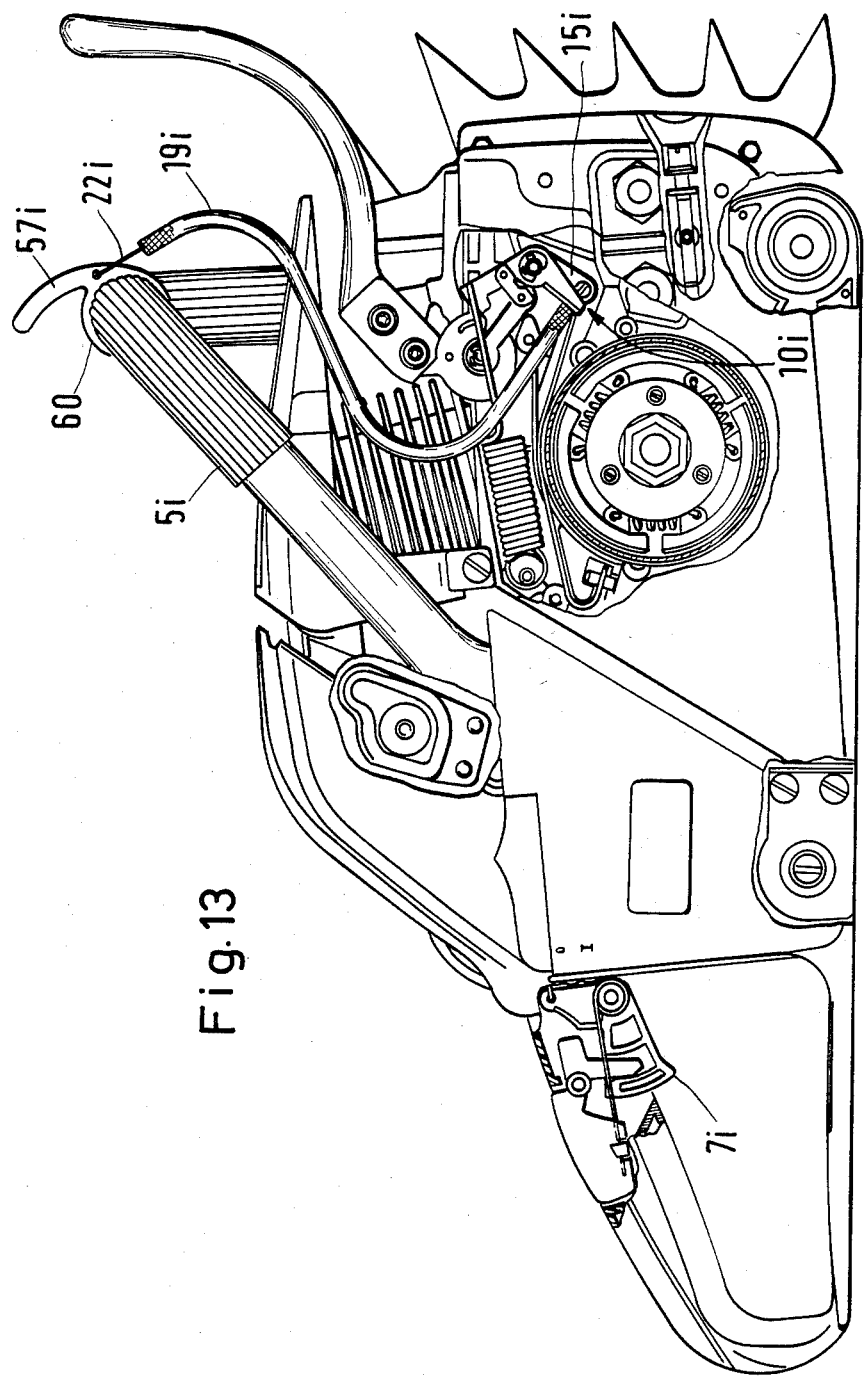

The embodiments of FIGS. 11 to 13 differ from the embodiment of FIGS. 9 and 10 in that the respective ends 22g to 22i of the Bowden cables 19g to 19i on the ends remote from the respective brake band levers 15g to 15i are not secured to the respective throttle levers 7g to 7i but are respectively secured to: an arm 56 of throttle lever locking device 8g, which arm extends upwardly beyond the rearward carrying handle 4g (FIG. 11); a pivot lever 57 pivotally mounted on the carrying handle 4h (FIG.12); and, a pivot lever 57i pivotally mounted on the forward carrying handle 5i (FIG. 13).

The throttle lever locking device 8g includes two arms, with the one arm 56 being formed by the forward lever arm on the end facing toward the guide bar. Since it is necessary to depress the throttle lever locking device 8g in a known manner to actuate the throttle lever 7g, the arm 56 will then pivot counterclockwise. Via the pull member 42g' of the Bowden cable 19g, the brake band lever 15g is pivoted clockwise and the brake band 16g is lifted clear of the clutch drum 2g. As soon as the throttle lever locking device 8g is released, it pivots back into its initial position under spring force, while the tension spring (not shown) between the spring lever 11g and the brake band lever 15g pivots the latter counterclockwise, whereby the brake band 16g is applied to the clutch drum 2g.

When the chain brake device 9g is released by the hand guard 6g, the spring lever 11g and the brake band lever 15g are pivoted counterclockwise in the manner described, and the brake band 16g is applied to the clutch drum 2g. The throttle lever locking device remains pressed down because no reaction force acts. In this embodiment too the Bowden cable casing 42g is stretched because it is fastened to the drive dog 24g of the spring lever 11g and to the housing 1g, so that the Bowden cable 19g has some overlength and therefore no reaction forces act on the throttle lever locking device 8g.

In accordance with the embodiment of FIGS. 9 and 10, the return movement of the hand guard 6g back into the release-ready position pivots the spring lever 11g clockwise in the manner already described, causing displacement of the Bowden cable casing 42g on the pull member 42g'. The brake band lever 15g remains, however, in its braking position since it is connected with the throttle lever locking device 8g via the pull member 42g'. Only when the locking device 8g is pressed will the brake band lever 15g also be pivoted clockwise in order to lift the brake band clear of the clutch drum 2g.

In the embodiment of FIG. 12, the pivot lever 57 is at a small distance from the throttle lever locking device 8h. When not pressed down, the two-armed pivot lever 57 extends with its longer lever arm outwardly out of a slot 59 beyond the carrying handle 4h. The Bowden cable 19h is connected at one end thereof to the shorter arm of the pivot lever 57 within the carrying handle 4h; whereas, its other end is connected to the spring lever 11h, and the brake band lever 15h in the same manner as in the preceding embodiment. While in the embodiment of FIG. 11 only the throttle lever locking device 8g has to be actuated for displacement of the brake band lever 15g and the brake band 16g, the present embodiment requires also actuation of the pivot lever 57 in addition to the throttle lever locking device 8h. In all other respects, the mode of operation of the chain brake device 9h is the same as in the preceding embodiment.

The pivot lever 57i of the embodiment of FIG. 13 has at its one end an annular member 60 rotatably mounted on the carrying handle 5i. One end of the Bowden cable 19i is connected to the pivot lever 57i. In all other respects, this embodiment corresponds fully to the embodiment of FIG. 12.

In the motor-driven chain saw of FIGS. 14 and 15, the spring lever 11j and 11k is configured as a two-armed lever as in the embodiments of FIGS. 9 to 11 previously described. However, the lower lever arm 15j, 15k on the side close to the clutch drum 2j, 2k is not part of the ancillary chain brake device 10j, 10k but part of the chain brake device 9j, 9k.

In the embodiment of FIG. 14, the lever arm 15j forms a first brake band lever. The freedom of movement of the brake band lever 16j independently of the chain brake device 9i is accomplished by providing a second brake band lever 61 which, as the brake band lever 15, 15a to 15j of the embodiments previously described, is pivotable about the pivot pin 23j of the spring lever 11j. Fastened to this brake band lever 61 is a second brake band 62 which may be wrapped around the clutch drum 2j several times as a result of which only small forces have to be exerted on the throttle lever for releasing the brake band 62.

In accordance with the embodiment of FIGS. 1 to 3, the casing 42j of the Bowden cable 19j is fastened to the housing 1j. The one end 22j of the pull member 42j' of the Bowden cable is fastened to the throttle lever 7j with a compensating spring 26j inserted therebetween, while the other end 22j' of the pull member 42j' is fastened to the brake band lever 61 which, in turn, is biased in the braking position by a tension spring 20j. Form and dimensions of the brake bands 16j and 62 may vary; both brake bands or only the first brake band may surround the clutch drum 2j several times. To release the brake band 62, only the throttle lever 7j has to be pressed down as a result of which the Bowden cable 19j moves the brake band lever 61 clockwise in opposition to the force of the tension spring 20j until it abuts the drive dog 24j of the spring lever 11j. The drive dog 24j is a lug projecting over the free end of the brake band lever 15j.

The chain brake device 9j is released as described, for example, in the embodiment of FIGS. 1 to 3, with the hand guard 6j pivoting the latching device 13j, 14j, the spring lever 11j with its drive dog 24j and the brake band lever 61 into the braking position, such that the clutch drum 2j is braked by both brake bands 16j, 62. As the hand guard 6j is pivotally rotated back to the release-ready position, the spring lever 11j and the brake band lever 15j are returned to the release position illustrated in FIG. 14 in the manner described. The brake band 16j is thereby lifted clear of the clutch drum 2j. The other brake band lever 61 is held in its braking position by the tension spring 20j. Only when the throttle lever 7j is pressed down will the brake band lever 61 be pivoted clockwise by means of the Bowden cable 19j. In all other respects, this embodiment operates in the same manner as the motor-driven chain saw of FIGS. 1 to 3.

In the motor-driven chain saw of FIG. 15, the free movement of the brake band 16k relative to the chain brake device 9k is accomplished in that the one brake band end 62k forms a holding member for the brake band and has a loop 63 defining a slot-like opening 64 for engaging a pin-like drive dog 24k of the lever arm 15k. The loop 63 is integrally formed with the brake band and lies approximately perpendicularly to the brake band 16k. Further, the loop 63 is preferably riveted to an L-shaped holding arm 66 likewise extending perpendicularly thereto. The end 22k' of the pull member 42k' of the Bowden cable 19k is fastened to the angular end 67 of the holding arm 66. The pull member end 22k' is surrounded by the compression spring 20k which biases the brake band end 62k into the braking position. As in the embodiment of FIG. 14, the pull member 42k' is fastened to the throttle lever 7k at its other end 22k.

In FIG. 15, actuation of the throttle lever 7k causes the holding arm 66 to be pulled to the left via the Bowden cable 19k, whereby the brake band 16k lifts clear of the clutch drum 2k. As soon as the throttle lever 7k is released, the spring 20k urges the holding arm 66 back into the braking position shown in FIG. 15, with the length of displacement of the holding arm 66 being limited by the lug-shaped drive dog 24k of the lever arm 15k.

As the chain brake device 9k is released via the hand guard 6k, the latching device 13k, 14k and the spring lever 11k are shifted into the braking position under the force of the tension spring 12k as described. As a result, the brake band 16k, which is connected to the lever arm 15k of the spring lever 11k via the anchoring loop 63, is firmly applied to the clutch drum 2k. Since, with the brake band 16k released, the drive dog 24k is at the right-hand end of the anchoring loop 63 in FIG. 15, the pivot movement of the spring lever 11k into its braking position also entrains the brake band end 62k, causing the brake band 16k to be pulled around the clutch drum 2 and bring it to a stop. The throttle lever 7k is returned to its initial position via the Bowden cable 19k. When the hand guard 6k is tensioned, only the chain brake device 9k is returned to its release position as in the other embodiments; whereas, the brake band 16k maintains its braking position, because the slot-like opening 64k of the anchoring loop 63 is so long that the drive dog 24k can be displaced within the opening 63 when the spring lever 11k is pivoted back. The brake band 16k assumes its release position only when the throttle lever 7k is actuated.

In all embodiments described, a mechanical (not shown) or electrical indicating device may be provided to indicate the actual position of the chain brake. The electrical indicating device may be configured similar to the embodiment of FIG. 8. In the embodiments of FIGS. 1 to 11 and 14 and 15, the Bowden cable 19, 19a to 19g, 19j and 19k may be anchored to the throttle lever 7, 7a to 7g, 7j and 7k as well as the throttle lever locking device 8, 8a to 8g, 8j and 8k, so that the force acting via the spring 20, 20a to 20g, 20j and 20k on the brake band lever 15, 15a to 15g, 61 and 61k is evenly distributed to both pressure members. It will be suitable to have the higher force act on the throttle lever locking device, because the operator's hand rests on the depressed throttle lever locking device from above and can therefore exert the force with less effort than the fingers which have to depress the throttle lever.

It is understood that the foregoing description is that of the preferred embodiments of the invention and that various changes and modifications may be made thereto without departing from the spirit and scope of the invention as defined in the appended claims.

What is claimed is:

1. A handheld, motor-driven chain saw comprising:
a motor housing having a handle;
a guide bar mounted on said housing for accommodating a saw chain therein;
a brake arrangement including:
a brake drum operatively connected to the saw chain;
a brake band disposed in surrounding relationship to said brake drum;
brake band holding means connected to said brake band and being mounted on said housing for movement between an inactive position whereat said brake band is disposed in spaced relationship to said brake drum and a braking position whereat said brake band is drawn tightly around said brake drum;
first resilient means for resiliently retaining said brake band holding means in said braking position;
manually displaceable means connected to said brake band holding means for moving and holding the latter in said inactive position against the force of said first resilient means thereby disengaging said brake band from said brake drum and to again cause said brake band to engage said brake drum under the force of said first resilient means when said displaceable means is manually released;

actuator means mounted in said housing so as to be movable from a first position to a second position for engaging said brake band holding means independently of said manually displaceable means and bringing the same into said braking position;

second resilient means for resiliently biasing said actuator means into said second position;

latching means for holding said actuator means in said first position against the force of said second resilient means; and, tripping means movable from a release-ready position to a released position for unlatching said latching means thereby causing said actuator means to move into said second position under the force of said second resilient means.

2. The handheld, motor-driven chain saw of claim 1, said manually displaceable means comprising:

a manually movable member mounted in said handle so as to be movable between rest and operate positions; and, an elongated movable member mounted in said housing interconnecting said manually movable member and said brake band holding means so as to move said holding means into said inactive position against the force of said first resilient means when said manually movable member is moved from said rest position into said operate position thereby disengaging said brake band from said brake drum.

3. The chain saw of claim 2, said elongated actuating member being a Bowden cable.

4. The chain saw of claim 2, wherein the chain saw includes a throttle trigger, said movable member being said throttle trigger.

5. The chain saw of claim 2, wherein the chain saw includes a throttle trigger and a throttle lock coacting with said throttle trigger, said manually movable member being said throttle lock.

6. The handheld, motor-driven chain saw of claim 2, wherein:

said brake band holding means is a brake band lever connected to said brake band and pivotally mounted on said housing for movement between said inactive position and said braking position;

said first resilient means is a first spring connected to said brake band lever for resiliently retaining said brake band lever in said braking position; and, said elongated member is a Bowden cable interconnecting said manually movable member and said brake band lever.

7. The handheld, motor-driven chain saw of claim 6, wherein:

said actuator means is an actuator lever pivotally mounted in said housing so as to be movable from said first position to said second position for engaging said brake band lever independently of said Bowden cable and bringing the same into said braking position;

said second resilient means is a second spring connected to said actuator lever for resiliently biasing the same into said second position;

said latching means is connected to said actuator lever for holding the same in said first position against the force of said second spring; and, said tripping means is a tripping lever pivotally mounted in said housing for movement from said release-ready position to said released position in response to a kickback movement of the chain saw, said tripping lever including means for engaging and unlatching said latching means thereby releasing said actuator lever to engage and pivot said brake band lever into said braking position.

8. The handheld, motor-driven chain saw of claim 7, wherein said brake band lever imparts a sharp load to said Bowden cable when said brake band lever is engaged by said actuator lever under the force of said second spring, the chain saw further comprising a force absorbing spring connected between said Bowden cable and said manually movable member for absorbing said sharp load.

9. The handheld, motor-driven chain saw of claim 2, wherein said brake band holding means imparts a sharp load to said elongated movable member when said holding means in engaged by said actuator means, the chain saw further comprising shock absorbing means connected in series with said manually movable member and said elongated movable member for absorbing said load.

10. The handheld, motor-driven chain saw of claim 2, wherein the chain saw includes a gasoline engine having a carburetor, the carburetor having a throttle flap rotatably mounted on a shaft for movement between an initial position and a closed position; the chain saw further comprising: a one-arm lever mounted on said shaft; and, an additional elongated movable member interconnecting said one-arm lever and said actuator means for moving said throttle flap into said closed position as said actuator means moves from said first position to said second position.

11. The handheld, motor-driven chain saw of claim 2, wherein the chain saw includes a gasoline engine having a carburetor, the carburetor having a throttle flap rotatably mounted on a shaft, the chain saw further comprising: an additional elongated movable member interconnecting said throttle flap and said brake band holding means for actuating said throttle flap when said manually movable member is moved to said rest position thereby interrupting the ignition of said engine.

12. The handheld, motor-driven chain saw of claim 2, said elongated movable member being a Bowden cable having a casing and a pull member arranged in said casing for interconnecting said brake band holding means and said manually movable member, said casing having two ends, one of said ends being braced on said housing and the other one of said ends being braced on said actuator means; and, said first resilient means being a spring disposed between said actuator means and said brake band holding means.

13. The handheld, motor-driven chain saw of claim 12, said chain saw having a throttle lever mounted in said handle and a locking lever for locking said throttle lever, said manually movable member being said locking lever.

14. The handheld, motor-driven chain saw of claim 12, said manually movable member being a pivot lever mounted on said handle.

15. The handheld, motor-driven chain saw of claim 1, wherein the chain saw includes a gasoline engine having a carburetor, the carburetor having a throttle flap rotatably mounted on a shaft for movement between an initial position and a closed position; said manually displaceable means comprising:

a manually movable member mounted in said handle so as to be movable between a rest position and an operate position;

a two-arm lever fixedly mounted on said shaft;

a first elongated movable member interconnecting one end of said two-arm lever and said manually movable member; and, a second elongated movable member interconnecting the other end of said two-arm lever and said brake band holding means.

16. The handheld, motor-driven chain saw of claim 15, the chain saw further comprising: an additional lever mounted on said throttle flap shaft so as to be rotatable with respect thereto; and, rotating means for rotating said additional lever and to entrain said two-arm lever so as to rotate the latter to said closed position while said manually movable member is in said operate position, said initial position being the position said throttle flap occupies before said manually movable member is moved from said rest position to said operate position.

17. The handheld, motor-driven chain saw of claim 16, said rotating means being an elongated actuating member interconnecting said additional lever and said actuator means.

18. The handheld, motor-driven chain saw of claim 1, said chain saw having a further handle mounted on said housing so as to be forward of said last-mentioned handle, said manually displaceable means comprising:

a manually movable pivot lever mounted on said further handle so as to be movable between rest and operate positions; and, an elongated movable member mounted in said housing interconnecting said manually movable pivot lever and said brake band holding means so as to move said holding means into said inactive position against the force of said first resilient means when said manually movable pivot lever is moved from said rest position into said operate position thereby disengaging said brake band from said brake drum.

* * * * *

UNITED STATES PATENT AND TRADEMARK OFFICE
CERTIFICATE OF CORRECTION

PATENT NO. : 4,683,660

DATED : August 4, 1987

INVENTOR(S) : Volker Schurr

It is certified that error appears in the above-identified patent and that said Letters Patent is hereby corrected as shown below:

In column 6, line 19: delete "34a" and substitute -- 34b -- therefor.

In column 12, line 52: delete "therein;" and substitute -- thereon; -- therefor.

In column 14, line 20: delete "in" and substitute -- is -- therefor.

Signed and Sealed this

Fifth Day of January, 1988

Attest:

DONALD J. QUIGG

Attesting Officer

Commissioner of Patents and Trademarks